（12） United States Patent
Duan et al.

(10) Patent No.: US 11,786,882 B2
(45) Date of Patent: Oct. 17, 2023

(54) DEVICE AND METHOD FOR MAGNETIC FIELD-ASSISTED SIMULATION OF ZERO-MICROGRAVITY FAME SYNTHESIS OF NANOPARTICLES

(71) Applicant: SOUTHEAST UNIVERSITY, Jiangsu (CN)

(72) Inventors: Lunbo Duan, Jiangsu (CN); Hetong Gao, Jiangsu (CN); Zhenkun Sun, Jiangsu (CN); Tianxin Li, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 18/245,331

(22) PCT Filed: Apr. 27, 2022

(86) PCT No.: PCT/CN2022/089538
§ 371 (c)(1),
(2) Date: Mar. 14, 2023

(87) PCT Pub. No.: WO2022/237542
PCT Pub. Date: Nov. 17, 2022

(65) Prior Publication Data
US 2023/0271153 A1 Aug. 31, 2023

(30) Foreign Application Priority Data

May 8, 2021 (CN) .................. 202110498545.X

(51) Int. Cl.
*B01J 19/08* (2006.01)
*B82Y 40/00* (2011.01)
*B01J 19/00* (2006.01)

(52) U.S. Cl.
CPC ......... *B01J 19/087* (2013.01); *B01J 19/0033* (2013.01); *B82Y 40/00* (2013.01);
(Continued)

(58) Field of Classification Search
CPC .................. B01J 19/087; B01J 19/0033; B01J 2219/00495; B01J 2219/085; B82Y 40/00
See application file for complete search history.

(56) References Cited

U.S. PATENT DOCUMENTS 6,452,140 B1 * 9/2002 Motokawa ............. C30B 30/08
373/139
2003/0017429 A1 1/2003 Cho
(Continued)

FOREIGN PATENT DOCUMENTS

CN 1791550 A 6/2006
CN 101734641 A 6/2010
(Continued)

OTHER PUBLICATIONS

Yuxiao Lu et al., "Flame spray pyrolysis synthesized CuO—CeO2 composite for catalytic combustion of C3H6", ScienceDirect, Key Laboratory of Energy Thermal Conversion and Control of Ministry of Education, School of Energy and Environment, Southeast University, Nanjing 210096, CN, Oct. 1, 2020, 8 pages.
(Continued)

*Primary Examiner* — Bernard Rojas
(74) *Attorney, Agent, or Firm* — MUNCY, GEISSLER, OLDS & LOWE, P.C.

(57) ABSTRACT

A device for magnetic field-assisted simulation of zero-microgravity flame synthesis of nanoparticles includes a gradient magnetic field device, a combustor and a product collection device. The gradient magnetic field device is composed of two magnetic field devices arranged face to face. The combustor is located between the two magnetic field devices. The outlet of the combustor is vertically upward. The position is below the magnetic field center of the gradient magnetic field device. The body force acting on the flame and surrounding magnetic species thereof by the gradient magnetic field device counteracts the gravitational
(Continued)

buoyancy lift effect, so that flame synthesis is carried out under a simulated zero/microgravity flame to prepare the nanoparticles. The device is able to use a gradient magnetic field to simulate the zero/microgravity flame on the ground to synthesize the nanoparticles under special flame characteristics, with reduced flame disturbance, improved stability, and no overheated region.

10 Claims, 1 Drawing Sheet

(52) U.S. Cl.
CPC .................. *B01J 2219/00495* (2013.01); *B01J 2219/085* (2013.01)

(56) References Cited

U.S. PATENT DOCUMENTS

| | | |
|---|---|---|
| 2005/0170301 A1 | 8/2005 | Pavlik et al. |
| 2010/0119724 A1 | 5/2010 | Donnet et al. |

FOREIGN PATENT DOCUMENTS

| | | |
|---|---|---|
| CN | 102380331 A | 3/2012 |
| CN | 203159722 U | 8/2013 |
| CN | 203238316 U | 10/2013 |
| CN | 207745881 U | 8/2018 |
| CN | 108946702 A | 12/2018 |
| CN | 112194187 A | 1/2021 |
| CN | 113181856 A | 7/2021 |
| JP | 2020132504 A | 8/2020 |

OTHER PUBLICATIONS

Guo Yong-Hong et al., "Effects of Electrostatic Field on the Oriented Growth of Carbon Nanotubes by V-shaped Flame Method", Journal of Synthetic Crystals, vol. 40, No. 2, Apr. 2011, 5 pages.

* cited by examiner

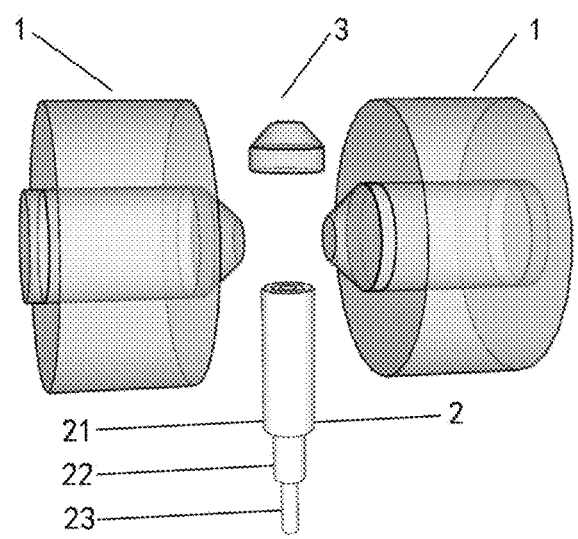

DEVICE AND METHOD FOR MAGNETIC FIELD-ASSISTED SIMULATION OF ZERO-MICROGRAVITY FAME SYNTHESIS OF NANOPARTICLES

TECHNICAL FIELD

This application is a technology for flame synthesis of nanoparticles, in particular a method and device for zero-microgravity flame synthesis of nanoparticles under magnetic field-assisted simulation.

BACKGROUND

Nanomaterials are materials that are in the nanoscale range (1-100 nm) in at least one dimension in a three-dimensional space or are materials composed of nanomaterials as basic units. The application of the nanomaterials and nanotechnology in energy, environment, resources, water treatment and other industries has made a good start, and the range of applications of the nanomaterials has gradually expanded. With the rapid development of the biotechnology, advanced manufacturing technology and other fields, the requirements for the nanomaterials are becoming increasingly high, and the miniaturization, intelligence, high integration, ultra-fast transmission, etc. of components require smaller and smaller material sizes. Aerospace, new military equipment, advanced manufacturing technologies and other application scenarios require increasingly high material performance.

Flame synthesis method is a novel technology for the synthesis of nanomaterials, where precursors form nanoparticles by pyrolysis, nucleation, collision, agglomeration or other processes, which can be used to synthesize oxides of almost all elements. In a ground-based constant gravity environment, as gas inside the flame is heated, the gravitational buoyancy lift effect causes the gas at the center of the flame to rise faster to form a water drop-shaped flame. In the environment of microgravity, the buoyancy lift disappears and the flame only diffuses at a gradient in the surrounding air, so that special flame shapes are produced, e.g., a diffusion flame of a low Reynolds number is in a spherical shape.

The flame of a special shape under microgravity affects the flow field, the component concentration field and the temperature field, which may have an impact on the particle growth process during flame synthesis and thus change the particle shape of products. On the one hand, there are reduced flame disturbance and improved stability because it is shielded from the gravitational buoyancy lift effect; on the other hand, the temperature field is evenly distributed so that there is no overheated region with a relatively high component concentration and a violent reaction, and products with a uniform particle size distribution can be produced. At the same time, because the microgravity is mainly diffusion-controlled, the combustion rate is lowered, the flame temperature decreases and the concentration of soot is reduced, which will improve the product purity.

To achieve the zero/microgravity flame synthesis simulation in constant gravity, falling towers, weightless aircraft or on-orbit space stations required for traditional microgravity experiments are needed, and consequently, the cost is high and large-scale long-term research cannot be achieved.

SUMMARY

Technical Problem

In response to the disadvantages of existing zero-microgravity experimental methods, the present disclosure aims to provide a device and method for magnetic field-assisted simulation of zero-microgravity flame synthesis of nanoparticles with the magnetic buoyancy lift effect generated by a gradient magnetic field counteracting the gravitational buoyancy lift effect.

Technical Solution

The device for magnetic field-assisted simulation of zero-microgravity flame synthesis of nanoparticles of the present disclosure includes a gradient magnetic field device, a combustor and a product collection device; the gradient magnetic field device is composed of two magnetic field devices arranged face to face, the combustor is located between the two magnetic field devices, the outlet of the combustor is vertically upward, and the position is below the magnetic field center of the gradient magnetic field device; when the use environment is the ground, and the purpose is to simulate a microgravity flame, the direction of the outlet of the combustor is vertically upward, opposite to the direction of a gradient magnetic field generated by the gradient magnetic field device, and at this time, oxygen is subjected to a vertically upward magnetic field gradient force, making the gradient magnetic field force counteract gravity, and the product collection device is located downstream of the flame to collect a synthesized target product; when the use environment is a microgravity environment, and the purpose is to simulate a constant gravity flame, the direction of the outlet of the combustor is the same as a magnetic field gradient direction, at this time, oxygen is subjected to a magnetic field gradient force in the same direction as the outlet of the combustor, making the magnetic field gradient force equivalent to gravity, and constant gravity flame synthesis is simulated in the microgravity environment.

The gradient magnetic field device is an electromagnet or a permanent magnet or a Helmholtz coil capable of providing a gradient magnetic field of a required intensity, the gradient magnitude $$B \cdot \frac{dB}{dz}$$

is 20-40 T²/m, wherein $$B \cdot \frac{dB}{dz}$$

is the magnetic field gradient of the gradient magnetic field in the vertical z direction, T is the unit of a magnetic field intensity, Tesla, and m is the unit of a length, meter.

The combustor includes a coaxial combustor, a McKenna flat flame premixed combustor, a Hencken combustor, or an atomizing nozzle combustor.

A precursor steam is at the center inside the coaxial combustor, a fuel is on the periphery of the precursor steam, an oxidant is on the periphery of the fuel, and the oxidant, the fuel and the precursor steam synthesize a flame at the outlet of the combustor.

The product collection device includes a fibrous filter or a thermophoretic collection device to collect nanoparticle products downstream of the flame, The product collection device uses the product directly for chemical vapor deposition for coating the surface of a workpiece.

The synthesized target product includes metal oxides, non-metal oxides, carbon nanoparticles or nanofilms.

A method for magnetic field-assisted simulation of zero-microgravity flame synthesis of nanoparticles of the device is as follow: a coaxial combustor, a McKenna flat flame premixed combustor, a Hencken combustor or an atomizing nozzle combustor are used, a precursor steam of target nanoparticles, a fuel and an oxidant are introduced into the combustor, the fuel at the outlet of the combustor is ignited and the flow rate of gas in each path is adjusted to obtain a suitable flame, the flame is placed in the gradient magnetic field device, the magnitude of a magnetic field gradient is adjusted to enable the flame to form a zero-microgravity flame, and zero-microgravity flame synthesis of nanoparticles is simulated by passing through a product collection device to become target product-nanoparticles.

Air at the outlet of the combustor is a paramagnetic substance, and under the effect of a magnetic field with the gradient direction vertically upward, the air will be subjected to a vertically upward magnetic body force effect; in the vertical z direction, the magnetization force borne by air per unit volume is expressed as:

$$F_m = \frac{\chi}{\mu_0} B \cdot \frac{dB}{dz} \quad (1)$$

in the above formula, $F_m$ is the magnetization force borne by the air per unit volume, $\mu_0$ is the vacuum permeability, $\chi$ is the volume susceptibility of the air, and $$B \cdot \frac{dB}{dz}$$

is the magnetic field gradient of the gradient magnetic field in the vertical z direction.

Gas in the flame under constant gravity at the outlet of the combustor is heated, decreasing the density, and then rises, and this effect is a gravitational buoyancy lift effect; the magnetic field gradient generated by the gradient magnetic field is used for having a vertically upward magnetic buoyancy lift effect on the air around the flame, which is equivalent to having a vertically downward buoyancy lift effect on the gas inside the flame; and when the magnetic buoyancy lift effect of the gradient magnetic field on the inside of the flame and the gravitational buoyancy lift effect counteract with each other, a zero-microgravity flame is formed.

The device and method may also be used in a microgravity environment such as an on-orbit satellite, a lunar surface, etc.

Beneficial Effects: The present disclosure has the following outstanding features and advantages compared with existing flame synthesis devices:
  compared with the existing flame synthesis device, the present disclosure is able to use the gradient magnetic field to simulate the zero-microgravity flame on the ground to synthesize nanoparticles under special flame characteristics, with reduced flame disturbance, improved stability, no overheated region, lowered flame temperature, and reduced soot concentration, and products with narrow particle size distribution and improved purity can be obtained.

Compared with existing zero-microgravity experimental methods, the cost is low and the running time is long. At the same time, the present disclosure can achieve the method for changing the shape of flame synthesized nanomaterials by adjusting magnetic field parameters.

BRIEF DESCRIPTION OF THE DRAWINGS

The FIGURE is a schematic diagram of a device for magnetic field-assisted simulation of zero/microgravity flame synthesis of nanoparticles of the present disclosure.

In the drawing, a gradient magnetic field device 1, a combustor 2, an oxidant 21, a fuel 22, a precursor steam 23, and a product collection device 3 are shown.

DETAILED DESCRIPTION

The technical solution of this application will be described below in detail with reference to the accompanying drawings.

A method and device for magnetic field-assisted simulation of zero-microgravity flame synthesis of nanoparticles of the present disclosure include a gradient magnetic field device, a combustor and a product collection device. A precursor for flame synthesis, a fuel and an oxidant are introduced into the combustor, the direction of the outlet of the combustor and the direction of a gradient magnetic field generated by the gradient magnetic field device are at a certain angle, so that the gradient magnetic field force counteracts the gravity, and the product collection device is located downstream of the flame to collect products.

The described gradient magnetic field device is an electromagnet or a permanent magnet or a Helmholtz coil capable of providing a gradient magnetic field of a certain intensity, the gradient magnitude $$B \cdot \frac{dB}{dz}$$

is 20-40 T$^2$/m. By controlling the magnitude and direction of the magnetic field gradient, zero/microgravity flame synthesis can be simulated.

The principle for the device to simulate zero/microgravity flame synthesis is as follows.

Air is a paramagnetic substance, and under the effect of a magnetic field with the gradient direction vertically upward, the air will be subjected to a vertically upward magnetic body force effect; in the vertical z direction, the magnetization force borne by air per unit volume can be expressed as:

$$F_m = \frac{\chi}{\mu_0} B \cdot \frac{dB}{dz} \quad (1)$$

in the above formula, $F_m$ is the magnetization force borne by the air per unit volume, $\mu_0$ is the vacuum permeability, $\chi$ is the volume susceptibility of the air, and $$B \cdot \frac{dB}{dz}$$

is the magnetic field gradient of the gradient magnetic field in the vertical z direction.

Gas in a flame under constant gravity is heated, decreasing the density, and then rises, and this effect is a gravitational buoyancy lift effect. The magnetic field gradient generated by the gradient magnetic field can be used for having a vertically upward magnetic buoyancy lift effect on the air around the flame, which is equivalent to having a vertically downward buoyancy lift effect on the gas inside the flame. When the magnetic buoyancy lift effect of the gradient magnetic field on the inside of the flame and the gravitational buoyancy lift effect counteract with each other, a zero-microgravity flame is formed.

The described combustor includes a coaxial combustor, a McKenna flat flame premixed combustor, a Hencken combustor or an atomizing nozzle combustor; a precursor steam of target nanoparticles, a fuel and an oxidant are introduced into the combustor; the fuel is ignited at the outlet of the combustor and the flow rate of gas in each path is adjusted to obtain a suitable flame, and then nano-products can be collected through the product collection device. Then the flame is placed under the described gradient magnetic field, and the flame forms the zero/microgravity flame by adjusting the magnitude of the magnetic field gradient, and the zero/microgravity flame synthesis is simulated.

The device and method may also be used in a microgravity environment such as an on-orbit satellite, a lunar surface, etc.

A preferred implementation of the device for magnetic field-assisted simulation of zero-microgravity flame synthesis of nanoparticles of the present disclosure, as shown in the FIGURE, includes a gradient magnetic field device 1, a combustor 2 and a product collection device 3; The combustor 2 is preferably a coaxial combustor, a precursor for flame synthesis, a fuel and an oxidant are introduced into the coaxial combustor, the outlet of the combustor is vertically upward, and the position is below the center of the magnetic field of the gradient magnetic field device 1. The product collection device 3 is preferably a filtering device made of glass fibers, followed by a vacuum pump, and the product collection device 3 is located above the flame to collect synthesized nanoparticles.

A precursor steam 23 is at the center inside the coaxial combustor, a fuel 22 is on the periphery of the precursor steam 23, an oxidant 21 is on the periphery of the fuel 22, and the oxidant 21, the fuel 22 and the precursor steam 23 synthesize a flame at the outlet of the combustor.

The precursor steam of the target nanoparticles is introduced into the center of the combustor 2, the fuel such as methane, hydrogen, etc. is introduced into a middle layer, the oxidant such as air or oxygen is introduced into an outer layer, the fuel is ignited at the outlet of the combustor 2 and the flow rate of gas in each path is adjusted to obtain a suitable flame, i.e., the nano oxide particles can be collected through the product collection device 3.

The flame is then subjected to a magnetic field with an upward gradient generated by the gradient magnetic field device 1. The current magnitude and the pole head spacing of the gradient magnetic field device 1 are adjusted, and at the same time, the relative positions of the flame at the outlet of the combustor 2 and the gradient magnetic field device 1 are fine adjusted, so that the local magnetic field gradient $$B \cdot \frac{dB}{dz}$$

is 30 $T^2$/m. When the magnetic buoyancy lift effect of the gradient magnetic field on the flame counteracts the gravitational buoyancy lift effect, the gradient magnetic field shields the gravitational effect, which forms the zero/microgravity flame to simulate zero/microgravity flame synthesis.

What is claimed is:

1. A device for magnetic field-assisted simulation of zero-microgravity flame synthesis of nanoparticles, wherein the method comprises a gradient magnetic field device, a combustor and a product collection device; the gradient magnetic field device is composed of two magnetic field devices arranged face to face, the combustor is located between the two magnetic field devices, the outlet of the combustor is vertically upward, and the position is below the magnetic field center of the gradient magnetic field device; when the use environment is the ground, and the purpose is to simulate a microgravity flame, the direction of the outlet of the combustor is vertically upward, opposite to the direction of a gradient magnetic field generated by the gradient magnetic field device, and at this time, oxygen is subjected to a vertically upward magnetic field gradient force, making the gradient magnetic field force counteract gravity, and the product collection device is located downstream of the flame to collect a synthesized target product; when the use environment is a microgravity environment, and the purpose is to simulate a constant gravity flame, the direction of the outlet of the combustor is the same as a magnetic field gradient direction, at this time, oxygen is subjected to a magnetic field gradient force in the same direction as the outlet of the combustor, making the magnetic field gradient force equivalent to gravity, and constant gravity flame synthesis is simulated in the microgravity environment.

2. The device for magnetic field-assisted simulation of zero-microgravity flame synthesis of nanoparticles according to claim 1, wherein the gradient magnetic field device is an electromagnet or a permanent magnet or a Helmholtz coil capable of providing a gradient magnetic field of a required intensity, the gradient magnitude $$B \cdot \frac{dB}{dz}$$

is 20-40 $T^2$/m, wherein $$B \cdot \frac{dB}{dz}$$

is the magnetic field gradient of the gradient magnetic field in the vertical z direction, T is the unit of a magnetic field intensity, Tesla, and m is the unit of a length, meter.

3. The device for magnetic field-assisted simulation of zero-microgravity flame synthesis of nanoparticles according to claim 1, wherein the combustor comprises a coaxial combustor, a McKenna flat flame premixed combustor, a Hencken combustor, or an atomizing nozzle combustor.

4. The device for magnetic field-assisted simulation of zero-microgravity flame synthesis of nanoparticles according to claim 3, wherein a precursor steam is at the center inside the coaxial combustor, a fuel is on the periphery of the precursor steam, an oxidant is on the periphery of the fuel, and the oxidant, the fuel and the precursor steam synthesize a flame at the outlet of the combustor.

5. The device for magnetic field-assisted simulation of zero-microgravity flame synthesis of nanoparticles according to claim 1, wherein the product collection device comprises a fibrous filter or a thermophoretic collection device to collect nanoparticle products downstream of the flame.

6. The device for magnetic field-assisted simulation of zero-microgravity flame synthesis of nanoparticles according to claim 1, wherein the synthesized target product comprises metal oxides, non-metal oxides, carbon nanoparticles or nanofilms.

7. A method for magnetic field-assisted simulation of zero-microgravity flame synthesis of nanoparticles of the device according to claim 1, wherein a coaxial combustor, a McKenna flat flame premixed combustor, a Hencken combustor or an atomizing nozzle combustor is used, a precursor steam of target nanoparticles, a fuel and an oxidant are introduced into the combustor, the fuel is ignited at the outlet of the combustor and the flow rate of gas in each path is adjusted to obtain a suitable flame, the flame is placed in the gradient magnetic field device, the magnitude of a magnetic field gradient is adjusted to enable the flame to form a zero-microgravity flame, and zero-microgravity flame synthesis of nanoparticles is simulated by passing through a product collection device to become target product-nanoparticles.

8. The method for magnetic field-assisted simulation of zero-microgravity flame synthesis of nanoparticles according to claim 7, wherein air at the outlet of the combustor is a paramagnetic substance, and under the effect of a magnetic field with the gradient direction vertically upward, the air will be subjected to a vertically upward magnetic body force effect; in the vertical z direction, the magnetization force borne by air per unit volume is expressed as:

$$F_m = \frac{\chi}{\mu_0} B \cdot \frac{dB}{dz} \quad (1)$$

in the above formula, $F_m$ is the magnetization force borne by the air per unit volume, $\mu_0$ is the vacuum permeability, $\chi$ is the volume susceptibility of the air, and $$B \cdot \frac{dB}{dz}$$

is the magnetic field gradient of the gradient magnetic field in the vertical z direction.

9. The method for magnetic field-assisted simulation of zero-microgravity flame synthesis of nanoparticles according to claim 8, wherein gas in the flame under constant gravity at the outlet of the combustor is heated, decreasing the density, and then rises, and this effect is a gravitational buoyancy lift effect; the magnetic field gradient generated by the gradient magnetic field is used for having a vertically upward magnetic buoyancy lift effect on the air around the flame, which is equivalent to having a vertically downward buoyancy lift effect on the gas inside the flame; and when the magnetic buoyancy lift effect of the gradient magnetic field on the inside of the flame and the gravitational buoyancy lift effect counteract with each other, a zero-microgravity flame is formed.

10. Application of the device for magnetic field-assisted simulation of zero-microgravity flame synthesis of nanoparticles according to claim 1, wherein the device for magnetic field-assisted simulation of zero-microgravity flame synthesis of nanoparticles is used for an orbit satellite and a lunar surface in a microgravity environment.

* * * * *